United States Patent
Boissieras et al.

[15] 3,697,568
[45] Oct. 10, 1972

[54] IMINOXYORGANOSILANES

[72] Inventors: Jean Boissieras; Louis Ceyzeriat; Guy Poy, all of Rhone, France

[73] Assignee: Rhone-Poulenc S.A., Paris, France

[22] Filed: Nov. 12, 1970

[21] Appl. No.: 89,149

[30] Foreign Application Priority Data

Nov. 12, 1969 France..................6938761

[52] U.S. Cl....260/448.8 R, 260/46.5 E, 260/46.5 G, 260/448.2 N, 260/448.2 E, 260/448.2 B
[51] Int. Cl.................................................C07f 7/18
[58] Field of Search..260/448.2 N, 448.2 E, 448.8 R, 260/448.2 B

[56] References Cited

UNITED STATES PATENTS

| | | | |
|---|---|---|---|
| 3,189,576 | 6/1965 | Sweet | 260/448.2 N X |
| 3,461,027 | 8/1969 | Plueddemann | 260/448.8 R X |
| 3,334,123 | 8/1967 | Culpepper | 260/448.8 R |

OTHER PUBLICATIONS

Noll, " Chemistry and Technology of Silicones," Academic Press, N.Y. (1968), pps. 81, 82, 100.

*Primary Examiner*—Delbert E. Gantz
*Assistant Examiner*—P. F. Shaver
*Attorney*—Stevens, Davis, Miller & Mosher

[57] ABSTRACT

Silanes $R-Si\ Y_a\ Q_{3-a}$ where R is unsubstituted or halo, alkoxy or nitrile substituted hydrocarbon radical, one of Y and Q is $-ON=CR'R''$ and the other is $O(DO)_nR'''$, $a=$ a number from 0.1 to 2.9, where R' is a hydrocarbon radical, R'' is H or $C_{1-5}$ alkyl, or R' and R'' together are divalent hydrocarbon radicals, R''' is $C_{1-4}$ aliphatic hydrocarbon radical, D is $C_{1-8}$ alkylene radical and $n=0$, 1, 2 or 3; are prepared by reacting $RSiE_aQ_{3-a}$ with YH where E is halogen or acyloxy. They may be used particularly as cross-linking agents for polydiorganosiloxanes having reactive terminal groups on the chain to give elastomer forming compositions which are storage stable in the absence of water and which cure to form elastomers in the presence of water at about 20° C.

14 Claims, No Drawings

IMINOXYORGANOSILANES

The present invention provides new silanes containing both iminoxy and organoxy groups bonded to the silicon atom, which can be used in numerous fields of organo-silicone chemistry.

The silanes of the present invention are those of general formula:

(I)

wherein R represents a monovalent hydrocarbon radical which may be substituted by halogen or by an alkoxy or nitrile group, one of Y and Q represents a

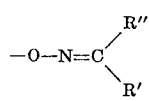

radical and the other of Y and Q represents a —O—$(DO)_nR'''$ radical, and $a$ represents a positive number in the range 0.1 to 2.9 inclusive; the symbols R', which may be the same or different, each represent a monovalent hydrocarbon radical, the symbols R'', which may be the same or different, each represent hydrogen or an alkyl radical containing one to five carbon atoms or, together with R' represent a divalent hydrocarbon radical, the symbols R''', which may be the same or different, each represent a monovalent aliphatic hydrocarbon radical having one to four carbon atoms, the symbols D, which may be the same or different, each represent an alkylene radical having one to eight carbon atoms and $n = 0, 1, 2$ or 3.

More particularly, R may represent an alkyl radical having one to 12 carbon atoms or an alkenyl radical having two to 12 carbon atoms, which may optionally be substituted by halogen or by a nitrile group; a cycloalkyl or cycloalkenyl radical having three to six ring carbon atoms, which may optionally be substituted by halogen; an ethynyl radical; a phenyl, alkylphenyl or phenylalkyl radical; or an alkoxyalkyl radical having three to 12 carbon atoms which may optionally be substituted by halogen or a nitrile group; R' may represent an alkyl radical having one to six carbon atoms or an alkenyl radical having two to six carbon atoms, a cycloalkyl or cycloalkenyl radical having give or six ring carbon atoms, a phenyl radical, or an alkylphenyl or phenylalkyl radical; R''' may represent an alkyl radical having one to four carbon atoms or an alkenyl radical having two to four carbon atoms; D may represent a polymethylene radical having one to four methylene groups in the chain, which themselves may optionally be substituted by a methyl group; alternatively R' and R'' together may form a polymethylene radical having three to six methylene groups in the chain, which themselves may optionally be substituted by methyl or ethyl groups.

Specific examples of radical R which may be present in the silanes of the invention include the following: substituted or unsubstituted alkyl and alkenyl radicals such as the methyl, ethyl, propyl, isopropyl, isobutyl, butyl, pentyl, hexyl, heptyl, octyl, nonyl, decyl, undecyl, dodecyl, vinyl, allyl, butenyl, pentenyl, decenyl, chloromethyl, trifluoropropyl, trifluorobutyl, β-cyanoethyl and gamma-cyanopropyl radicals; cycloalkyl and cycloalkenyl radicals having three, four, five or six ring carbon atoms, which may optionally be substituted by one to two halogen atoms, such as cyclopropyl, cyclobutyl, cyclopentyl, cyclohexyl, cyclopentenyl, cyclohexenyl, dichlorocyclopropyl, difluorocyclopropyl, difluorocyclobutyl and difluorocyclohexyl radicals; alkylphenyl radicals, such as tolyl and cumenyl radicals; phenylalkyl radicals such as benzyl and phenylethyl radicals; alkoxyalkyl radicals having three to 12 carbon atoms, which may optionally be substituted by halogen atoms or a nitrile group, such as methoxyethyl, methoxypropyl, ethoxypropyl, β-trifluoroethoxypropyl and β-cyanoethoxypropyl radicals.

Specific examples of radicals R' include alkyl and alkenyl radicals, such as methyl, ethyl, propyl, butyl, pentyl, hexyl, allyl and butenyl radicals; cycloalkyl and cycloalkenyl radicals having five or six ring carbon atoms, such as cyclopentyl, cyclohexyl, cyclopentenyl and cyclohexenyl radicals; alkylphenyl radicals such as tolyl and xylyl radicals; and phenylalkyl radicals such as benzyl radicals.

When R'' represents an alkyl radical, it may be methyl, ethyl, isopropyl, propyl, butyl or pentyl.

Specific examples of radicals R''' include methyl, ethyl, propyl, isopropyl, isobutyl, allyl and butenyl.

Specific examples of radicals D, include methylene, ethylene, propylene, isopropylene and butylene radicals.

Specific examples of divalent polymethylene radicals having three to six methylene groups in the chain, which may optionally be substituted by methyl or ethyl groups, and which are derived from the joining of two radicals R' and R'' and form carbocyclic radicals with the carbon atom of the iminoxy group

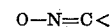

include those of formulas:

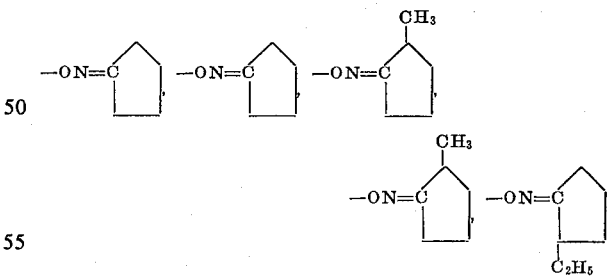

It should be understood that the silanes of the invention, of formula I, can be pure products or mixtures, with the degree of purity depending on the method of obtaining these silanes and on their greater or lesser ease of purification by known methods of organosilicon chemistry. When the symbol $a$ has a value of 1 or 2, the formula (I) represents a pure product; when $a$ represents a non-integral value, the product of formula (I) is a mixture containing at least one pure product of formula I in which the value of $a$ is 1 or 2.

Examples of specific silanes of the invention are those of formulas:

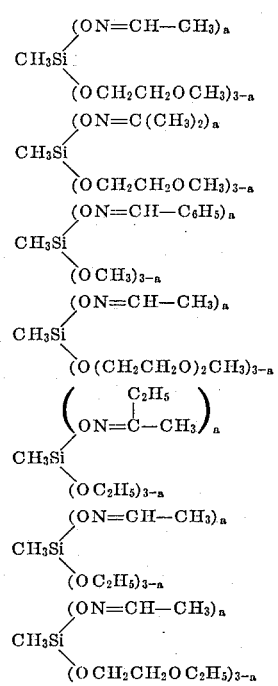
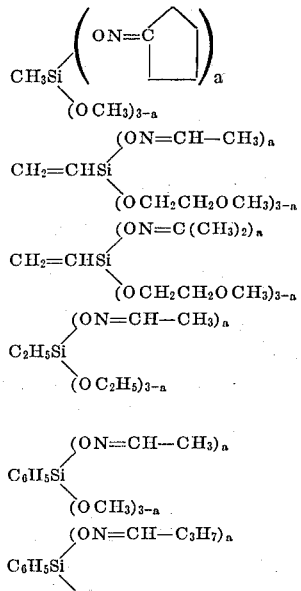

$a$, as already indicated, represents any number ranging from 0.1 to 2.9.

The preparation of the silanes of formula I is effected by complete reaction of a compound of general formula:

in which E represents a halogen atom or an acyloxy radical, with a compound of general formula HY.

The general reaction could thus be represented by the stoichiometric equation:

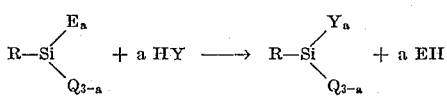

However, radical exchange phenomena can occur on the same molecule of the organosilicon derivative and the value of the symbol $a$ of the product obtained can differ somewhat from the value $a$ of the starting product.

The symbol E may represent fluorine, chlorine or bromine atoms or radicals of formula MCOO— in which M represents hydrogen, an alkyl radical with one to four carbon atoms or an aryl radical, for example, M may be a methyl, ethyl, propyl or phenyl radical.

The process described above can be effected under conditions which vary depending on the values of E and Q in the starting material. 1. If $Q = O(DO)_n R'''$

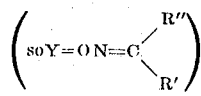

and E = halogen, about two-thirds of the stoichiometric amount of the silane of formula II is reacted with a nitrogen-containing base in an inert diluent medium, an oxime of formula

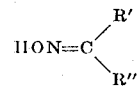

is then reacted, and finally the resulting reaction mixture is reacted with about one-third of the stoichiometric amount of the silane of formula (II). The resulting silane of formula (I) is then isolated by any convenient means.

By "nitrogen-containing organic base," we mean ammonia and the primary amines.

Suitable bases include primary alkylamines or arylamines such as methylamine, ethylamine, butylamine and aniline. However ammonia is preferred because of its high reactivity, its low molecular weight and its ease of availability at a lower price.

The diluent which is inert towards the reagents employed is preferably a chlorinated organic solvent or a hydrocarbon solvent, for example, tetrachlorethane, chlorobenzene, orthodichlorobenzene, cyclohexane, methylcyclohexane, toluene, xylene or cumene.

In a preferred method of preparing the silanes I, two-thirds of the molar amount of the halogenorganoxysilane of formula (II) is initially used, and is diluted with an inert solvent chosen from those mentioned above, in an amount which can represent 2 to 10 times the volume of the silane of formula (II). A stream of anhydrous ammonia is introduced into this solution for the requisite period of time for the reaction with the Si-halogen bonds to be complete. The temperature of the reaction medium is advantageously maintained at 5°–50 C. by efficient cooling. When the reaction is complete, no more ammonium chloride forms, and the ammonia is evolved from the reactor. The oxime of the carbonyl compound, HP, is then added to the mixture, and is used in slight excess over the theoretical amount required to react with all the Si-halogen bonds of the reagent of formula (II) involved in the reaction; a molar excess of 3 to 10 percent is suitable. From the time when these reagents are brought into contact, the reaction is slightly exothermic and a temperature below 50° C. is preferably maintained by slight external cooling. Finally, the silane (II) not yet used, the remaining one-third of the total molar amount, is slowly introduced, while controlling the temperature of the reaction mixture so that it should become established at below 50° C., as already indicated. It is sometimes advantageous, after adding the silane, to heat the mixture for some hours under reflux in order to complete the reaction. The mixture is thereafter treated in a usual manner: it is filtered, the residual solid is washed with an inert diluent, preferably of the same nature as that already used, the wash solvent is combined with the filtrate, and after removing the diluent and the volatile products by heating under reduced pressure, the silane of formula (I) is obtained. In general, the pure silanes of formula (I) in which $a = 1$ or 2 can be isolated by fractional distillation; this distillation is not always necessary and it is subsequently possible, in numerous fields of application, to use the crude mixture which frequently shows identical behavior to that of the pure distilled product.

The halogenosilane starting material of formula (II), in which E represents a halogen atom, is prepared by partial reaction of an organic hydroxy compound of general formula:

$$HO(DO)_nR''' \qquad (III)$$

with a halogenosilane of formula $$RSiE_3 \qquad (IV)$$

in which E represents a halogen atom.

For example, the hydroxy compound of formula III is slowly added to the halogenosilane of formula $RSiE_3$. During this reaction a halogen acid EH is formed in addition to the halogenorganoxysilane of formula (II), and this acid is removed as it is formed by carrying it away by means of an inert gas such as nitrogen or by forming a salt with a tertiary amine such as triethylamine or pyridine. It is sometimes advantageous to add to the reagents a diluent which is inert towards them, in order to moderate the reaction, but its presence is not indispensable. The molar ratio (III)/(IV) can vary over a wide range of values such as 0.1:1 to 3.1:1. After completion of the reaction, a mixture is obtained from which the silanes of formula (II), in which a has the value of 1 or 2, can very frequently be isolated in the pure state by fractional distillation; the first and last distillation runnings consist principally of the silanes of formula $RSiE_3$ and $RSI[O(DO)_nR''']_3$. However, if the distillation only separates mixtures, the latter correspond to formula II in which a can assume any value from 0.1 to 2.9. In fact, by varying both the reaction temperature and the molar ratio III/IV, the desired halogenorganoxysilane can be prepared as the major constituent, with a yield which can exceed 90 percent.

As halogenosilane of formula $RSiE_3$, it is preferred to use organotrichlorosilanes, such as methyltrichlorosilane, vinyltrichlorosilane, ethyltrichlorosilane, propyltrichlorosilane, allyltrichlorosilane, phenyltrichlorosilane, cyclohexenyltrichlorosilane or 2,2-dichlorocyclopropyltrichlorosilane. 2. If $Q = O(DO)_nR'''$

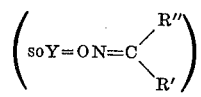

and E = acyloxy, the silane of formula (II) is reacted with the oxime of formula

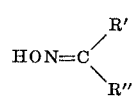

the mixture is then diluted with an inert solvent, a nitrogen-containing base is added to complete the reaction, and the desired silane of formula (I) is isolated.

A preferred way of carrying out this process is to introduce the oxime of formula

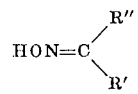

into the reactor, containing the silane of formula (II), in a sufficient molar amount to neutralize all the acyloxy radicals present; in general, a molar excess of about 5 to 15 percent of this oxime is used. The reaction is slightly exothermic, and the temperature easily settles down to below 50° C. To complete the reaction, that is to say, to react the acyloxy radicals still bonded to the silicon, the reaction mixture is diluted with an inert diluent at the rate of 0.5 to 5 times the volume of the reagents, and ammonia is immediately introduced for the requisite time for the reaction with the mixture to be complete. The reaction with ammonia is rather vigorous and the temperature can be kept within the range of 20°–70° C. by cooling from outside the reactor; when ammonia is evolved from the reactor, the introduction of ammonia is stopped and the silane of formula (I) is isolated from the reaction mixture in the way already indicated in the variant of the process in which E represents a halogen atom.

The starting silane

of formula (II), in which E represents an acyloxy radical can be obtained by partial reaction of an organic hydroxylic compound of general formula:

$$HO(DO)_nR''' \qquad (III)$$

with a triacyloxysilane of general formula $RSiE_3$ (IV) in which E represents an acyloxy radical.

In a preferred method for the preparation of this intermediate of formula (II) a calculated molar amount of the hydroxy compound of formula III which would theoretically form the silane of formula (II) having the desired value $a$ is added to an organotriacyloxysilane of formula (IV). The reaction can take place in an inert diluent medium; if the triacyloxysilane has a rather low melting point, the process is preferably carried out without a diluent by simply introducing the hydroxy compound into the molten silane, and the temperature changes gradually, ranging from the melting point of the triacyloxysilane to ambient temperature (about 20° C.). The organic acid formed and the volatile products are thereafter removed by distillation under reduced pressure, avoiding, if possible, exceeding a temperature of 150° C. in the material. A mixture of silanes of formula (II) is thus obtained which consists predominantly of the desired silane, which can be isolated pure by known means of organic chemistry.

·The starting organotriacyloxysilane may be a methyltriacetoxysilane, a vinyltriacetoxysilane or a phenyltriacetoxysilane. 3. If Q =

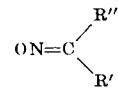

(so Y = O(DO)$_n$R'''), the silane of formula (II), in which E represents a halogen atom or an acyloxy radical, is reacted completely with the hydroxy compound of formula (III). The reaction is preferably completed by introducing a nitrogen-containing base into the mixture which has previously been diluted with an inert solvent.

This technique is particularly useful if the oxime

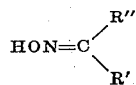

is of very low reactivity and hence has difficulty in reacting with the halogen atoms or the acyloxy radicals. However, the compounds of formula I obtained by this particular variant of the process are in the form of more complex mixtures than those prepared by using either of two methods first mentioned. These mixtures are rather difficult to separate by fractional distillation into pure silanes of formula (I) in which $a = 1$ or 2.

The starting silane of formula (II),

can be obtained by partial reaction of a compound RSiE$_3$, in which E represents a halogen atom or an acyloxy radical, with an oxime

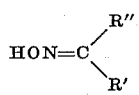

The silanes of formula I can be used in numerous fields of organosilicon chemistry and organic chemistry. For example, they can be substituted for the conventional cross-linking agents employed in organosilicon compositions which can be cured to give elastomers at ambient temperature (that is to say within the range of $-10°$ to $+60°$ C.) in the presence of water and are storage-stable in the absence of water. The elastomers are those based on polydiorgano-siloxanes terminated, at each end of their chain, by a reactive radical such as hydroxyl, alkoxy, amino, aminoxy, iminoxy or acyloxy group and there may also be incorporated in the compositions customary fillers and a conventional cross-linking agent such as an organotriacyloxysilane, an organotris(ketoniminoxy)silane, an organotris(N-alkylamino)-silane, an organotris(aldiminoxy)silane or an organotri-aminoxysilane. Furthermore, they can be employed for the treatment of fillers such as finely divided silicas, quartz powder, clays, carbon black and glass fibers, as well as for the treatment of coarser materials such as sand, gravel, mortar mixtures, and glass beads. They can also prove effective in the waterproofing and lubrication of natural and synthetic fabrics, and of asbestos and glass fabrics. Furthermore, they can be applied, by themselves or combined with conventional silanes such as aminoalkyltrialkoxysilanes, aminoalkoxyalkyltrialkoxysilanes, epoxyalkoxyalkyltrialkoxysilanes, epoxycycloalkyltrialkoxysilanes and acroyloxy- and methacroyloxy-alkyltrialkoxysilanes, to the most diverse substrates to cause organosilicon derivatives and organic derivatives, such as resins, elastomers, varnishes, adhesives, undercoats and paints, to adhere to them. Finally, the silanes containing a radical R of the alkenyl, cycloalkenyl and ethynyl type can be copolymerized with organosilicon monomers and polymers and with organic monomers and polymers which themselves contain aliphatically unsaturated bonds, in the presence of free radical generating reagents, so as together to form a combination of polymers with remarkable properties which can be used in advanced fields of industry such as the continuous lacquering of metal panels and the coating of articles of complicated shapes by the fluidized bed technique; in this latter case, the polymers are pulverulent solids.

The examples which follow illustrate the invention.

EXAMPLE 1

152 g. (0.66 mol) of a silane of formula CH$_3$Si(OCH$_2$CH$_2$OCH$_3$)$_2$Cl and 500 cm$^3$ of anhydrous cyclohexane are introduced into a 1 l. flask, equipped with a reflux condenser, a stirrer, a dropping funnel, a gas inlet tube dipping to the bottom of the flask and a thermometer sleeve.

Anhydrous ammonia is introduced, by means of the gas inlet tube, into this stirred solution, which is kept throughout the process at a temperature of about 35° C. by means of a waterbath placed under the flask. As soon as ammonia is introduced, a white precipitate of ammonium chloride forms; the passage of ammonia lasts for about 1 hour 10 minutes and is stopped when the ammonia has totally reacted with the reaction mixture and hence escapes from the flask.

Thereafter, 62 g. (1.05 mol) of acetaldehyde oxime are added to the mixture over the course of 5 minutes, followed by 76 g. (0.3 mol) of the silane already used, of formula CH$_3$Si(OCH$_2$CH$_2$OCH$_3$)$_2$Cl, added over the course of 40 minutes. During this addition the temperature in the reaction mixture is throughout kept at about 35° C. by external cooling.

The mixture in the flask is then filtered, and the precipitate is washed with 150 cm$^3$ of cyclohexane; this wash solvent is added to the filtrate and the cyclohexane and the volatile products are removed by gradual heating under reduced pressure so as to reach a temperature of 110° C. in the mass and a pressure of 30 mm. of mercury. 230 g. of a colorless liquid of viscosity 3.2 centistokes (cSt) at 20° C. are obtained, which when purified by distillation yield a silane of average formula CH$_3$Si(OCH$_2$CH$_2$OCH$_3$)$_{1.9}$(ON=CH—CH$_3$)$_{1.1}$ boiling at 82°–87°C. under 0.5–0.7 mm. of mercury, $n_D^{20} = 1.429$, $d_4^{20} = 1.045$, the structure of which is confirmed by infra-red spectrophotometry.

The starting silane CH$_3$Si(OCH$_2$CH$_2$OCH$_3$)$_2$Cl was prepared as follows. 897 g. (6 mols) of methyltrichlorosilane are introduced into a 2 l. flask equipped with a reflux condenser, a stirrer, a dropping funnel, a gas inlet tube dipping to the bottom of the flask and a thermometer sleeve. When the stirrer is running, 684 g. (9 mols) of the monomethyl ether of ethylene glycol are added to this silane by means of the dropping funnel, over the course of 2 hours 10 minutes. During this addition, a gentle stream of nitrogen entering through the tube passes through the reaction mixture and carries away the hydrochloric acid formed. The temperature of the mixture remains at about 25° C. of its own accord.

When the addition is complete, stirring and gentle bubbling of nitrogen is continued for 2 hours. The mixture is thereafter separated by fractionation under reduced pressure and the following are collected: 332 g. of the silane of formula: $CH_3Si(OCH_2CH_2OCH_3)Cl_2$, having the following characteristics:

| | |
|---|---|
| Boiling point $_{15-16}$ | : 57–58°C. |
| % of chlorine | : 37.2 |
| $d_4^{20}$ | : 1.157 |
| $n_D^{20}$ | : 1.420 | and 589 g. of the silane of formula: $CH_3Si(OCH_2CH_2OCH_3)_2Cl$, having the following characteristics:

| | |
|---|---|
| Boiling point$_{15-16}$ | : 110–111°C. |
| % of chlorine | : 15.75 |
| $d_4^{20}$ | : 1.088 |
| $n_D^{20}$ | : 1.421 |

EXAMPLE 2

126 g. (0.66 mol) of the silane prepared in Example 1, of formula $CH_3Si(OCH_2CH_2OCH_3)Cl_2$ and 500 cm³ of cyclohexane are introduced into a 1 l. flask equipped as described in Example 1. Ammonia is then introduced into the stirred mixture, in sufficient amount to react completely with the silane. During this addition, which lasts about 2 hours, the temperature of the mixture does not exceed 30°–35° C., because of external cooling.

The following are then successively added to this mixture, with constant stirring: 124 g. (2.1 mols) of acetaldehyde oxime, over the course of 5 minutes, followed by a solution of 63 g. (0.33 mol) of the silane already used, of formula $CH_3Si(OCH_2CH_2OCH_3)Cl_2$, in 50 cm³ of cyclohexane, added over the course of 1 hour, while constantly maintaining the temperature of the reaction mixture at about 30°–35° C.

The mixture is then filtered, the precipitate is washed with 150 cm³ of cyclohexane, the washings being added to the filtrate, and the solvent and the volatile products are removed by heating under reduced pressure. The residue of viscosity 5.35 cSt at 20° C., weighs 219 g. On distillation of this residue, the silane of formula $CH_3Si(OCH_2CH_2OCH_3)(ON=CH-CH_2)_2$, boiling at 80° C. under 0.25 mm. of mercury, is recovered:

$n_D^{20} = 1.44$ $d_4^{20} = 1.057$

EXAMPLE 3

440 g. (2 mols) of liquid methyltriacetoxysilane, heated to a temperature of about 45° C., are added to a 2 l. flask equipped as described in Example 1. The mixture is stirred, and 152 g. (2 mols) of the monomethyl ether of ethylene glycol are added to this silane over the course of 15 minutes, and stirring is then continued for about 30 minutes; during this period of time the temperature of the reaction mixture drops slowly to ambient temperature. The acetic acid formed and the volatile products are then removed by gradual heating under reduced pressure so as to reach a temperature in the mass of 105° C. and a pressure of 15 mm. of mercury. 124 g. of acetic acid and of volatile products are thus collected.

245 g. (4.15 mols) of acetaldehyde oxime are added to the well-stirred residue over the course of 20 minutes; the temperature rises a little and does not exceed 30° C. Thereafter 600 cm³ of cyclohexane are added to dilute the whole, and ammonia is immediately introduced into the mixture to facilitate completing the reaction, the temperature being maintained at about 30° C. by external cooling.

When the ammonia is evolved from the flask, its introduction is stopped, the precipitate is filtered and washed with 500 cm³ of cyclohexane which are added to the filtrate, the solvent and the volatile products are removed, and 457 g. of a colorless liquid residue of viscosity 5.2 cSt at 20° C. are collected. This residue is purified by distillation, and a silane of average formula: $CH_3Si(OCH_2CH_2OCH_3)_{1.1}(ON=CH-CH_3)_{1.9}$ boiling at 90° C. under 0.9–1 mm. of mercury is obtained, the structure of which is determined with the aid of infrared absorption spectrophotometry.

EXAMPLE 4

440 g. (2 mols) of methyltriacetoxysilane heated to a temperature of 45° C. are introduced into a 2 l. flask equipped as described in Example 1, the stirrer is started and 304 g. (4 mols) of the monomethyl ether of ethylene glycol are added over the course of 17 minutes; stirring is then continued for 30 minutes. 241 g. of acetic acid and of volatile products are then removed by heating under reduced pressure and 130 g. (2.2 mols) of acetaldehyde oxime are then added to the residue over the course of 7 minutes.

The resulting mixture is diluted with 320 cm³ of cyclohexane and ammonia is introduced in the same manner as in Example 3 so as to complete the reaction, the temperature of the mixture being maintained at about 30° C. by external cooling. 496 g. of a liquid residue of viscosity 3.1 cSt at 20° C. are obtained by treatment of the mixture similar to the treatment of that of the preceding Example. This residue is purified by distillation to give a silane of formula: $CH_3Si(OCH_2CH_2OCH_3)_2ON=CH-CH_3$ b.p. 0.3 about 80°–81° C.; its formula is established by means of infra-red absorption spectrophotometry.

EXAMPLE 5

A similar procedure to that of Examples 3 and 4 is followed by introducing 440 g. (2 moles) of methyltriacetoxysilane into a 2 l. flask equipped as already indicated, and adding 456 g. (6 mols) of the monomethyl ether of ethylene glycol over the course of 25 minutes. Stirring is continued for 30 minutes, and 367 g. of acetic acid and of volatile products are then removed by heating under reduced pressure. 34 g. (0.58 mol) of acetaldehyde oxime are added to the residue over the course of 3 minutes, the mixture is diluted with 80 cm³ of cyclohexane, and ammonia is passed into the mixture to facilitate completion of the reaction. After working up as described in the previous Examples, 527 g. of a limpid residue of viscosity 2.4 cSt at 20° C. are collected, and this material on distillation yields a silane of average formula:

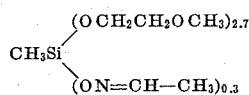

boiling at 90°–91° C. under 0.6 mm. of mercury.

EXAMPLE 6

1,760 g. (8 mols) of methyltriacetoxysilane heated to a temperature of 45° C. are introduced into a 5 l. flask equipped as described in Example 1 and are stirred, and 1,133 g. (19.2 mols) of acetaldehyde oxime are introduced over the course of 18 minutes, with external cooling to prevent the temperature of the mixture rising above 40°–45° C. Stirring is thereafter continued for 1 hour. 1,182 g. of acetic acid and of volatile products are then removed by distillation under reduced pressure and 760 g. (10 mols) of the monomethyl ether of ethylene glycol are added to the residue over the course of 7 minutes. As in the preceding Examples, the mixture is diluted with cyclohexane (900 cm³) and ammonia is passed in for 5 hours to facilitate completion of the reaction. During this period of time the temperature is kept at about 40° C.

The mixture is filtered, the precipitate is washed with cyclohexane, the solvent is removed and 1,777 g. of a residue are collected and purified by distillation, yielding a silane of average formula $CH_3Si(ON=CH-CH_3)_{1.5}(OCH_2CH_2OCH_3)_{1.5}$ having the following characteristics:

Boiling point$_{0.8}$ = 93–94°C.
$d_4^{20}$ = 1.051
$n_D^{20}$ = 1.434

Its structure is established by analysis with the aid of nuclear magnetic resonance and infra-red absorption spectrophotometry.

EXAMPLE 7

On working under the same conditions as in Examples 1 and 2 but replacing the methyltrichlorosilane by vinyltrichlorosilane, silanes are obtained of which the physical characteristics are set out in Table I.

TABLE I

| Physical characteristics | Boiling point | Density, $d_4^{20}$ | Refractive index, $n_D^{20}$ |
|---|---|---|---|
| Silanes synthesised: | | | |
| $CH_2=CH-SiCl_2(OCH_2CH_2OCH_3)$ | B.P.$_{13}$=66° C | 1.151 | 1.435 |
| $CH_2=CHSiCl(OCH_2CH_2OCH_3)_2$ | B.P.$_{8-9}$=107–109° C | 1.091 | 1.433 |
| $CH_2=CHSi\begin{matrix}(ON=CH-CH_3)_2\\OCH_2CH_2OCH_3\end{matrix}$ | B.P.$_{2-3}$=120–130° C | 1.056 | 1.449 |
| $CH_2=CHSi\begin{matrix}ON=CH-CH_3\\(OCH_2CH_2OCH_3)_2\end{matrix}$ | B.P.$_{0.8}$=99–100° C | 1.04 | 1.437 |

EXAMPLE 8

Examples 1 and 2 are repeated, substituting phenyltrichlorosilane for methyltrichlorosilane and using, in addition to acetaldehyde oxime, butyraldehyde oxime; the silanes so prepared have the physical characteristics set out in Table II.

TABLE II

| Physical characteristics | Boiling point | Density, $d_4^{20}$ | Refractive index, $n_4^{20}$ |
|---|---|---|---|
| Silanes synthesized: | | | |
| $C_6H_5SiCl_2(OCH_2CH_2OCH_3)$ | B.P.$_{3-4}$=108–109° C | 1.207 | 1.500 |
| $C_6H_5SiCl(OCH_2CH_2OCH_3)_2$ | B.P.$_{1-105}$=124–128° C | 1.130 | 1.485 |
| $C_6H_5-Si\begin{matrix}(ON=CH-CH_3)_2\\OCH_2CH_2OCH_3\end{matrix}$ | | 1.112 | 1.500 |
| $C_6H_5-Si\begin{matrix}ON=CH-CH_3\\(OCH_2CH_2OCH_3)_2\end{matrix}$ | | 1.101 | 1.481 |
| $C_6H_5-Si\begin{matrix}(ON=CH-C_3H_7)_2\\OCH_2CH_2OCH_3\end{matrix}$ | | 1.062 | 1.494 |

EXAMPLE 9

Examples 1 and 2 are repeated, replacing the monomethyl ether of ethylene glycol by ethanol, n-butanol and isopropanol, and in addition to acetaldehyde oxime, using acetone oxime; the silanes synthesized have their physical characteristics set out in Table III.

EXAMPLE 10

Examples 1 and 2 are repeated, except that the monomethyl ether of ethylene glycol is replaced by the corresponding monoethyl ether; the physical characteristics of the silanes prepared are set out in Table IV.

TABLE III

| Physical characteristics<br>Silanes synthesized: | Boiling point | Density, $d_4^{20}$ | Refractive index, $n_D^{20}$ |
|---|---|---|---|
| $CH_3-Si\begin{pmatrix}OC_2H_5\\Cl_2\end{pmatrix}$ | B.P.$_{.743}$=99–101° C | 1.100 | 1.398 |
| $CH_3-Si\begin{pmatrix}OC_2H_5\\(ON=C\begin{smallmatrix}H\\CH_3\end{smallmatrix})_2\end{pmatrix}$ | B.P.$_{.2-3}$=70–80° C | 1.005 | 1.428 |
| $CH_3Si\begin{pmatrix}OC_2H_5\\(ON=C\begin{smallmatrix}CH_3\\CH_3\end{smallmatrix})_2\end{pmatrix}$ | B.P.$_{.0.5}$=67–75° C | 0.987 | 1.435 |
| $CH_3Si\begin{pmatrix}OC_4H_9\\Cl_2\end{pmatrix}$ | B.P.$_{.95}$=85° C | 1.0458 | 1.4076 |
| $CH_3-Si\begin{pmatrix}OC_4H_9\\(ON=CH-CH_3)_2\end{pmatrix}$ | | 0.9895 | 1.435 |
| $CH_3-Si\begin{pmatrix}OCH(CH_3)_2\\Cl_2\end{pmatrix}$ | B.P.$_{.750}$=114–116° C | 1.0732 | 1.3994 |
| $CH_3-Si\begin{pmatrix}OCH(CH_3)_2\\(ON=CH-CH_3)_2\end{pmatrix}$ | | 0.988 | 1.431 |

TABLE IV

| Physical characteristics<br>Silanes synthesized: | Boiling point | Density, $d_4^{20}$ | Refractive index, $n_D^{20}$ |
|---|---|---|---|
| $CH_3Si\begin{pmatrix}Cl_2\\OCH_2CH_2OC_2H_5\end{pmatrix}$ | B.P.$_{.15}$=62–63° C | 1.115 | 1.419 |
| $CH_3Si\begin{pmatrix}Cl\\(OCH_2CH_2OC_2H_5)_2\end{pmatrix}$ | B.P.$_{.15}$=119° C | 1.039 | 1.420 |
| $CH_3Si\begin{pmatrix}(ON=CH-CH_3)_{2.1}\\(OCH_2CH_2OC_2H_5)_{0.9}\end{pmatrix}$ | B.P.$_{.0.12}$=75–113° C | 1.031 | 1.438 |
| $CH_3Si\begin{pmatrix}(ON=CH-CH_3)_{1.1}\\(OCH_2CH_2OC_2H_5)_{1.9}\end{pmatrix}$ | B.P.$_{.0.3-0.4}$=85–95° C | 1.013 | 1.429 |

EXAMPLE 11

The chloralkoxysilanes prepared in Example 1 are reacted with the oximes of acetone, methyl ethyl ketone and butyraldehyde, in accordance with the procedure described in Examples 1 and 2; the iminoxyalkylsilanes synthesized have their physical characteristics set out in Table V.

TABLE V

| Physical characteristics | Boiling point | Density, $d_4^{20}$ | Refractive index, $n_D^{20}$ |
|---|---|---|---|
| Silanes synthesised: | | | |
| $CH_3Si(OCH_2CH_2OCH_3)_2(ON=C-(CH_3)_2)$ | $B.P._{0.7-0.8}=93°\ C$ | 1.028 | 1.430 |
| $CH_3Si(OCH_2CH_2OCH_3)(ON=C-(CH_3)_2)_2$ | $B.P._{0.5}=92-94°\ C$ | 1.034 | 1.442 |
| $CH_3Si(OCH_2CH_2OCH_3)_2(ON=C(CH_3)(C_2H_5))$ | $B.P._{.1}=97-99°\ C$ | 1.015 | 1.431 |
| $CH_3Si(OCH_2CH_2OCH_3)(ON=C(CH_3)(C_2H_5))_2$ | $B.P._{0.7}=102-107°\ C$ | 1.000 | 1.440 |
| $CH_3Si(OCH_2CH_2OCH_3)(ON=C(H)(C_3H_7))_2$ | $B.P._{0.1}=106-107°\ C$ | 0.998 | 1.437 |

EXAMPLE 12

An organopolysiloxane composition is prepared by intimately mixing the following constituents, with exclusion of moisture:

| | |
|---|---|
| α,ω-dihydroxydimethylpolysiloxane oil of viscosity 20,000 cPo at 25°C. | 100 g. |
| pyrogenic silica of specific surface area 200 m²/g. | 7.5 g. |
| finely divided calcium carbonate | 25 g. |
| iminoxyorganoxysilane synthesized as described in Example 2, of formula 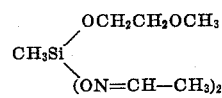 | 4 g. |
| catalyst derived by reaction of dibutyl-tin dilaurate with butyl ortho-titanate in the weight ratio of 100:27 by heating to 120° C. for 3 hours | 0.2 g. |

A fraction C of this composition is spread over a glass plate previously coated with a non-stick agent. The layer deposited, of about 2 mm. thickness, is exposed to air for 24 hours, the relative humidity being greater than 50 percent and the temperature being of the order of 20° C. At the end of this period of time the layer has been converted into a rubbery, firm and supply film which can easily be detached from the substrate.

Another fraction D is subjected to accelerated aging by heating in a closed flask for 96 hours at 100° C., and is then caused to cure on a glass plate as described above. The following mechanical properties are then measured on the films of silicone elastomer thus obtained, which are however left in air at about 20° C. for one week to complete their crosslinking:

Shore A hardness (Standard ASTM D 676-59 T)
Tensile strength: RR (Standard AFNOR T 46,002, $H_3$ dumb-bells)
Elongation at break: A in % (Standard AFNOR T 46,002, $H_3$ dumb-bells).

The results of these measurements are shown in Table VI.

TABLE VI

| Sample | Shore A hardness | Tensile strength in kg/cm² | % elongation at break |
|---|---|---|---|
| Fraction C | 33 | 16.8 | 330 |
| Fraction D | 31 | 16.5 | 300 |

The remainder of the composition is packaged in a leakproof aluminum tube. After 6 months' storage the appearance of the composition remains unchanged and the elastic films which it yields on exposure to moisture show mechanical properties substantially comparable to those shown in Table VI. This type of composition is used for the manufacture of non-stick coatings and protective coatings on metals, timber, paper, fabrics of inorganic or organic fibers, ceramic, earthenware and brick, as well as for caulking boats and encasing electronic equipment.

EXAMPLE 13

A composition is prepared by mixing the following ingredients in an anhydrous atmosphere:

| | |
|---|---|
| α,ω-dihydroxydimethylpolysiloxane oil of viscosity 80,000 cPo at 25°C. | 100 g. |
| pyrogenic silica of specific surface area 200 m²/g, treated with octamethylcyclotetrasiloxane | 20 g. |

| | |
|---|---|
| quartz flour | 100 g. |
| α,ω-bis(trimethylsiloxy)dimethyl-polysiloxane oil of viscosity 20 cPo at 25°C. | 60 g. |
| iminoxyorganoxysilane used in Example 12 of formula $CH_3Si\begin{smallmatrix}OCH_2CH_2OCH_3\\ (ON=CH-CH_3)_2\end{smallmatrix}$ | 5 g. |
| catalyst used in Example 12 | 0.1 g. |

A fraction $C_1$ and a fraction $D_1$ of this composition (the fraction $D_1$ being put aside to age by heating in a closed flask for 96 hours at 100° C.) are spread on glass plates, in air at about 20° C., to yield rubbery films, in accordance with the technique indicated in the preceding Example.

The mechanical properties of the films are set out in Table VII.

TABLE VII

| Sample | Shore A hardness | Tensile strength in kg/cm² | % elongation at break |
|---|---|---|---|
| Fraction $C_1$ | 33 | 20 | 365 |
| Fraction $D_1$ | 32 | 14.3 | 230 |

The remainder of the composition is stored in a leak-proof aluminum tube. After 6 months it is found that the stored composition has the same capacity for crosslinking in the presence of moisture as that freshly prepared. This type of composition is suitable for the manufacture of moulds which reproduce articles made of organic resins or of metals of low melting point, for taking dental impressions, for the production of supported or unsupported insulating tapes, and for gluing materials.

EXAMPLE 14

A crosslinking agent of the iminoxyorganoxysilane type, chosen from among those described in Examples 2, 7, 8, 9 and 11, of which the formula and the amount employed are given in Table VIII, is incorporated in a composition consisting of:

| | |
|---|---|
| α,ω-dihydroxydimethylpolysiloxane oil of viscosity 300,000 cPo at 25°C. | 100 g. |
| α,ω-bis(trimethylsiloxy)dimethyl-polysiloxane oil of viscosity 20 cPo at 25°C. | 100 g. |
| pyrogenic silica of specific surface area 200 m²/g, treated with octamethylcyclotetrasiloxane | 27 g. |
| catalyst used in Examples 12 and 13 | 0.2 g. |

The compositions so prepared, which can be cured by atmospheric humidity, are used to obtain films of silicone elastomer by following the working method of Example 12; a fraction $C_2$ of the compositions is employed as such, and another fraction $D_2$ is aged by heating in a closed flask for 96 hours at 100° C., and the remainder is stored with exclusion of moisture.

The mechanical properties of the films are set out in Table VIII; in addition to the Shore A hardness, the tensile strength and the elongation at break, the "-modulus" is also given, that is to say the load in kg/cm² for an elongation of 100 percent (Standard AFNOR T 46,002, $H_3$ dumb-bells).

TABLE VIII

| Crosslinking agent | Weight of crosslinking agent added, in g. | Type of composition used | Shore A hardness | Tensile strength in kg./cm.² | Percent elongation at break | Modulus, in kg./cm.² |
|---|---|---|---|---|---|---|
| $CH_3Si\begin{smallmatrix}OCH_2CH_2OCH_3\\ (ON=CH-CH_3)_2\end{smallmatrix}$ | 3.5 | $C_2$ | 16 | 18.7 | 720 | 2.3 |
| | | $D_2$ | 15 | 12 | 635 | 1.9 |
| $CH_3Si\begin{smallmatrix}OCH_2CH_2OCH_3\\ (ON=CHC_3H_7)_2\end{smallmatrix}$ | 4.65 | $C_2$ | 18 | 18.7 | 710 | 2.3 |
| | | $D_2$ | 17 | 15.7 | 610 | 2 |
| $CH_3Si\begin{smallmatrix}OCH_2CH_2OCH_3\\ (ON=C(CH_3)_2)_2\end{smallmatrix}$ | 4.2 | $C_2$ | 16 | 16.7 | 670 | 2.2 |
| | | $D_2$ | 15 | 13.5 | 730 | 2.1 |
| $CH_3Si\begin{smallmatrix}OCH_2CH_2OCH_3\\ (ON=C(CH_3)C_2H_5)_2\end{smallmatrix}$ | 4.65 | $C_2$ | 17 | 18 | 740 | 2.1 |
| | | $D_2$ | 15 | 12 | 570 | 1.9 |
| $CH_3Si\begin{smallmatrix}OC_2H_5\\ (ON=C(CH_3)_2)_2\end{smallmatrix}$ | 3.75 | $C_2$ | 17 | 17.5 | 670 | 1.9 |
| | | $D_2$ | 14 | 12.6 | 695 | 1.7 |
| $C_6H_5Si\begin{smallmatrix}OCH_2CH_2OCH_3\\ (ON=CH-CH_3)_2\end{smallmatrix}$ | 4.74 | $C_2$ | 16 | 21 | 875 | 1.8 |
| | | $D_2$ | 14 | 16 | 950 | 1.5 |
| $C_6H_5Si\begin{smallmatrix}OCH_2CH_2OCH_3\\ (ON=CHC_3H_7)_2\end{smallmatrix}$ | 5.61 | $C_2$ | 15 | 19.3 | 840 | 2.2 |
| | | $D_2$ | 12 | 12.6 | 770 | 1.6 |
| $CH_2=CHSi\begin{smallmatrix}OCH_2CH_2OCH_3\\ (ON=CH-CH_3)_2\end{smallmatrix}$ | 3.94 | $C_2$ | 17 | 17.2 | 720 | 1.8 |
| $CH_3Si\begin{smallmatrix}OC_4H_9\\ (ON=CH-CH_3)_2\end{smallmatrix}$ | 6 | $C_2$ | 18 | 19.6 | 635 | 2.7 |
| | | $D_2$ | 18 | 16.5 | 560 | 2.7 |

The compositions stored with the exclusion of moisture yield, on exposure to moisture after numerous months' storage, silicone elastomers which display mechanical properties of the order of those mentioned in Table VIII.

These compositions, which become converted into elastomers of low modulus, are particularly useful for leakproof joints and expansion joints in building, particularly for masonry, pavings, runways, pipelines, moulded articles and concrete constructions.

EXAMPLE 15

A composition is prepared by intimately mixing the following ingredients with exclusion of air:

| | |
|---|---|
| α,ω-dihydroxydimethylpolysiloxane oil of viscosity 18,400 cPo at 25°C. | 100 g. |
| pyrogenic silica of specific surface area 200 m²/g | 8 g. |
| iminoxyorganoxysilane used in Example 12 of formula | |

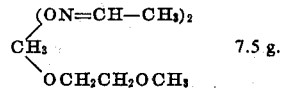

7.5 g.

catalyst used in Example 12   0.2 g.

On casting this composition on glass plates treated with a non-stick agent, supple, elastic and transparent films are obtained after exposure to air at about 20° C.

We claim:

1. A silane of the general formula

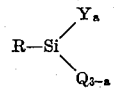

wherein R represents an unsubstituted monovalent hydrocarbon radical, a halogen substituted monovalent hydrocarbon radical, an alkoxy substituted monovalent hydrocarbon radical or a nitrile substituted monovalent hydrocarbon radical, one of Y and Q represents a

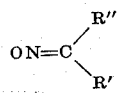

radical and the other of Y and Q represents a —O—(DO)$_n$R''' radical, and a represents a positive number in the range 0.1 to 2.9 inclusive; the symbols R', which may be the same or different, each represent a monovalent hydrocarbon radical, the symbols R'', which may be the same or different, each represent hydrogen or an alkyl radical containing one to five carbon atoms or, together with R' represent a divalent hydrocarbon radical, the symbols R''', which may be the same or different, each represent a monovalent aliphatic hydrocarbon radical having one to four carbon atoms, the symbols D, which may be the same or different, each represent an alkylene radical having one to eight carbon atoms and $n=0, 1, 2$ or 3.

2. A silane according to claim 1 wherein R represents an alkyl radical having one to 12 carbon atoms or an alkenyl radical having two to 12 carbon atoms.

3. A silane according to claim 1 wherein R represents a methyl, vinyl or phenyl radical.

4. The silane of claim 1 wherein R' represent an alkyl group having one to six carbon atoms.

5. The silane of claim 4 wherein R' represents a methyl, ethyl or propyl radical.

6. The silane of claim 1 wherein R'' represents hydrogen or a methyl radical.

7. The silane of claim 1 wherein D represents a —CH$_2$CH$_2$— radical.

8. The silane of claim 1 wherein R''' represents a methyl, ethyl or propyl radical.

9. The silane of claim 1 wherein R represents methyl, vinyl or phenyl, R' represents methyl, ethyl or propyl, R'' represents hydrogen or methyl, D represents —CH$_2$CH$_2$— and R''' represents methyl, ethyl or propyl.

10. A process for the preparation of a silane according to claim 1 which comprises completely reacting a compound of general formula:

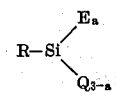

with a compound of general formula HY where E represents halogen or an acyloxy radical and R, Q, Y and a are as defined in claim 1.

11. A process according to claim 10 wherein E represents chlorine or an acetoxy radical.

12. A process according to claim 10 wherein about two-thirds of the stoichiometric amount of a silane reactant of formula:

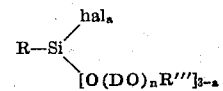

wherein hal represents halogen, is reacted with ammonia or a primary alkylamine or arylamine in an inert diluent, the resulting product reacted with an oxime of formula HO·N=CR'R'' and the resulting reaction product reacted with the remaining one-third of the stoichiometric amount of the silane reactant.

13. A process according to claim 10 wherein a silane reactant of formula:

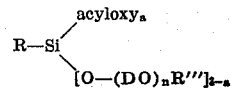

is reacted with an oxime of formula HO·N=CR'R'', the mixture diluted with an inert diluent and ammonia or a primary alkylamine or arylamine added to complete the reaction.

14. A process according to claim 10 wherein a silane reactant of formula:

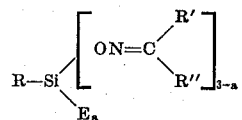

is reacted with a hydroxy compound of formula:

* * * * *